United States Patent [19]

Chappell

[11] Patent Number: 5,127,804
[45] Date of Patent: Jul. 7, 1992

[54] BICYCLE SEAT-TUBE PUMP WITH ONE-WAY VALVES

[75] Inventor: Gilmore H. Chappell, Deptford, N.J.

[73] Assignee: Innovative Bicycle Products, Inc., Huntingdon Valley, Pa.

[21] Appl. No.: 499,917

[22] Filed: Mar. 27, 1990

Related U.S. Application Data

[63] Continuation-in-part of Ser. No. 391,350, Aug. 9, 1989.

[51] Int. Cl.⁵ .................................................. F04B 17/06
[52] U.S. Cl. .................................. 417/231; 417/546; 417/547; 417/555.1; 280/201
[58] Field of Search .............. 417/231, 555.1, 546, 417/547, 548, 512, 313; 280/201; 137/860

[56] References Cited

U.S. PATENT DOCUMENTS

| | | |
|---|---|---|
| 549,308 | 11/1895 | Blackman et al. |
| 554,084 | 2/1896 | Ostrander . |
| 588,840 | 8/1897 | Simpson . |
| 589,711 | 9/1897 | Foote . |
| 632,696 | 9/1899 | Buxbaum . |
| 657,845 | 9/1900 | Wolbrecht . |
| 668,214 | 2/1901 | Rast . |
| 674,829 | 5/1901 | Furbow . |
| 679,512 | 7/1901 | Rock . |
| 700,841 | 5/1902 | Smith . |
| 702,743 | 6/1902 | Pratt . |
| 702,976 | 6/1902 | Lymburner . |
| 797,231 | 8/1905 | Scanlan . |
| 802,695 | 10/1905 | Ingham et al. |
| 849,227 | 4/1907 | Gilberti . |
| 877,337 | 1/1908 | Herr . |
| 1,091,435 | 3/1914 | Johnson . |
| 1,270,661 | 6/1918 | Reed . |
| 1,319,137 | 10/1919 | Black et al. |
| 1,886,158 | 11/1932 | Brown ............................ 417/555.1 |
| 1,933,223 | 10/1933 | Skui . |
| 2,027,758 | 1/1936 | Zucker . |
| 2,287,360 | 6/1942 | Sappington ...................... 417/546 |
| 2,858,767 | 11/1958 | Smith . |
| 2,901,980 | 7/1959 | Jordan ............................ 417/554 |
| 3,832,141 | 8/1974 | Haldopoulos . |
| 3,904,325 | 9/1975 | Olofsson et al. ................ 417/512 |
| 4,673,000 | 6/1987 | Haerr et al. ..................... 137/860 |
| 4,712,592 | 12/1987 | Brown ............................. 417/313 |
| 4,775,303 | 10/1988 | Liska . |
| 4,842,290 | 6/1989 | Alioto ............................. 280/201 |

FOREIGN PATENT DOCUMENTS

| | | |
|---|---|---|
| 955795 | of 1974 | Canada . |
| 93691A | 11/1983 | European Pat. Off. ......... 417/553 |
| 874256 | 3/1953 | Fed. Rep. of Germany . |
| 1019450 | 10/1952 | France . |
| 305325 | 2/1933 | Italy . |
| 27688 | of 1887 | United Kingdom . |
| 696168 | 8/1953 | United Kingdom ............ 417/526 |

Primary Examiner—Richard A. Bertsch
Assistant Examiner—Michael I. Kocharov
Attorney, Agent, or Firm—Eckert Seamans Cherin & Mellott

[57] ABSTRACT

Air pumps particularly suitable for use with bicycles includes a first elongated tube to form a pump chamber and housing, a second elongated tube coupled with a piston in the first tube to reciprocate the piston within the pump chamber. A flexible hose extends from the piston and through the second tube and has at its exposed end an air valve coupling. The first and second tubes are releasably secured to permit use of the pump as a seat post. The pump includes a first valve on the outside of the piston between atmosphere and a closed end of the pump chamber and a second valve inside the piston between the closed end of the chamber and the flexible hose. The first valve is configured to provide greater seal effect as pressure builds in the closed end of the pump chamber.

7 Claims, 7 Drawing Sheets

BICYCLE SEAT-TUBE PUMP WITH ONE-WAY VALVES

This application is a continuation-in-part of U.S. patent application Ser. No. 07/391,350 filed Aug. 9, 1989.

FIELD OF THE INVENTION

The invention relates to pumps and, in particular, to air pumps suitable for manual manipulation and internal installation in bicycles.

BACKGROUND OF THE INVENTION

A variety of manually actuable air pumps have been devised particularly for use with bicycles.

A large number of these air pumps use a portion of the bicycle frame as the pump housing and chamber. The major advantage provided by most if not all of these pumps is that they permit manual operation of the pump without having to remove the pump from the bicycle. In many cases, the seat is coupled with an arm of the pump carrying the pump piston to permit reciprocation of the piston operating the pump.

These types of pumps also suffer from several disadvantages. First, the pump is not removable from the bicycle itself since the frame forms a portion of the pump. Second, in many cases such pumps include components which are mounted within the frame members that are thereafter brazed or welded together making subsequent access to the components for repair difficult or impossible without adversely affecting the frame or the finish of the bike. Third, the tubing used in most, though not necessarily all bicycle frames tends to be rather thin and of average commercial quality. Such tubing is weakened and subject to corrosion in areas where it is penetrated, for example to provide air pump fittings.

A lesser number of air pumps designed for use with bicycles include separate pump housings which may be removed from a bicycle frame internally receiving the pump. The major disadvantage of such pumps is that, in all cases known, they must be removed from the bicycle frame to permit operation.

Another major disadvantage of all known, manually operated air pumps is their limited pressure capability. Virtually all such pumps use for piston sealing, a flexible diaphragm having an outer circumferential portion which is formed to permit air to pass when a partial suction is created within the pump chamber and to prevent blowby when air is being compressed in the pump chamber. However, this design has a maximum pressure capability of about 100 psi or less before compressed air blowby will occur.

SUMMARY OF THE INVENTION

In one aspect, the invention is a manually-operable air pump comprising a housing containing a pump chamber having a closed end. It further comprises a piston assembly including a piston within the chamber, a connecting arm having a first end coupled with the piston and an opposing second end, and an air passage extending generally axially through the piston. The pump further comprises means coupled with the connecting arm for manually reciprocating the piston in the chamber. The pump further comprises first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber. The pump further comprises second, one-way valve means for permitting air to pass from the chamber into the air passage when the piston is being moved in the first axial direction and for preventing air from passing through the air passage into the chamber when the piston is being moved in the second axial direction.

In another aspect, the invention includes a high-pressure manually operable pump comprising a housing including a pump chamber, a piston in the chamber, manual actuating means coupled with the piston for reciprocating the piston within the chamber, and one-way valve means on the piston. According to this aspect of the invention, the one-way valve means includes an annular valve member and groove means extending circumferentially around an outer surface of the piston for receiving the annular valve member on the piston. At least a portion of the groove means has an axial dimension greater than a maximum axial dimension of an adjoining portion of the valve member to permit axial movement of at least the adjoining portion of the valve member along at least the portion of the groove means in the axial direction to open the one-way valve means and allow fluid to pass through the one-way valve means. The one-way valve means further includes a tapered annular valve seat at one axial end of the groove means. The one-way valve means closes when the annular valve member seats on the tapered valve seat.

In another aspect, the invention is a bicycle seat post air pump which comprises a first elongated tube having a length and outer diameter sufficient for removable receipt in a seat tube of a bicycle frame and clamping by a collar of the seat tube. It further comprises a second elongated tube having a length less than the first elongated tube length and an outer diameter less than the first elongated tube outer diameter, the length and outer diameter of the second elongated tube being sufficient for removable receipt and clamping of the second elongated tube in a seat post collar of a bicycle seat. One of the first and second elongated tubes forms a pump chamber and the remaining one of the first and second elongated tubes is coupled with a piston in the pump chamber for reciprocating the piston. The pump further comprises means for releasably fixedly securing together the first and second elongated tubes. The pump further comprises a flexible air hose extending from the second elongated tube and having an air valve coupling at an exposed second end of the flexible air hose.

BRIEF DESCRIPTION OF THE DRAWING

The foregoing summary, as well as the following detailed description of the preferred embodiment in the invention, will be better understood when read in conjunction with the appended drawings. For the purpose of illustrating the invention, there is shown in the drawings, embodiment(s) which are presently preferred. It should be understood, however, that the invention is not limited to the precise arrangements and instrumentalities shown. In the drawings.

DETAILED DESCRIPTION OF PREFERRED EMBODIMENTS

-In the figures, like numerals are used to indicate like elements.

FIGS. 1 through 5 depict a first embodiment, high pressure, manually-operable air pump of the present invention, indicated generally at 10, in a preferred mounting on a bicycle, a portion of which is depicted and indicated generally at 12. The air pump 10 is used as the seat post coupling the seat 14, to the bike frame, indicated generally at 16. A lower end of the pump 10 is received in the seat tube 26 of the frame 12 and is clamped in the frame 12 with the collar 28 provided at the mouth of the seat tube 26. The upper end of the pump 10 is received and clamped in the seat post collar 30 (sectioned in FIG. 1) of the seat 14.

Figures 1, 2:
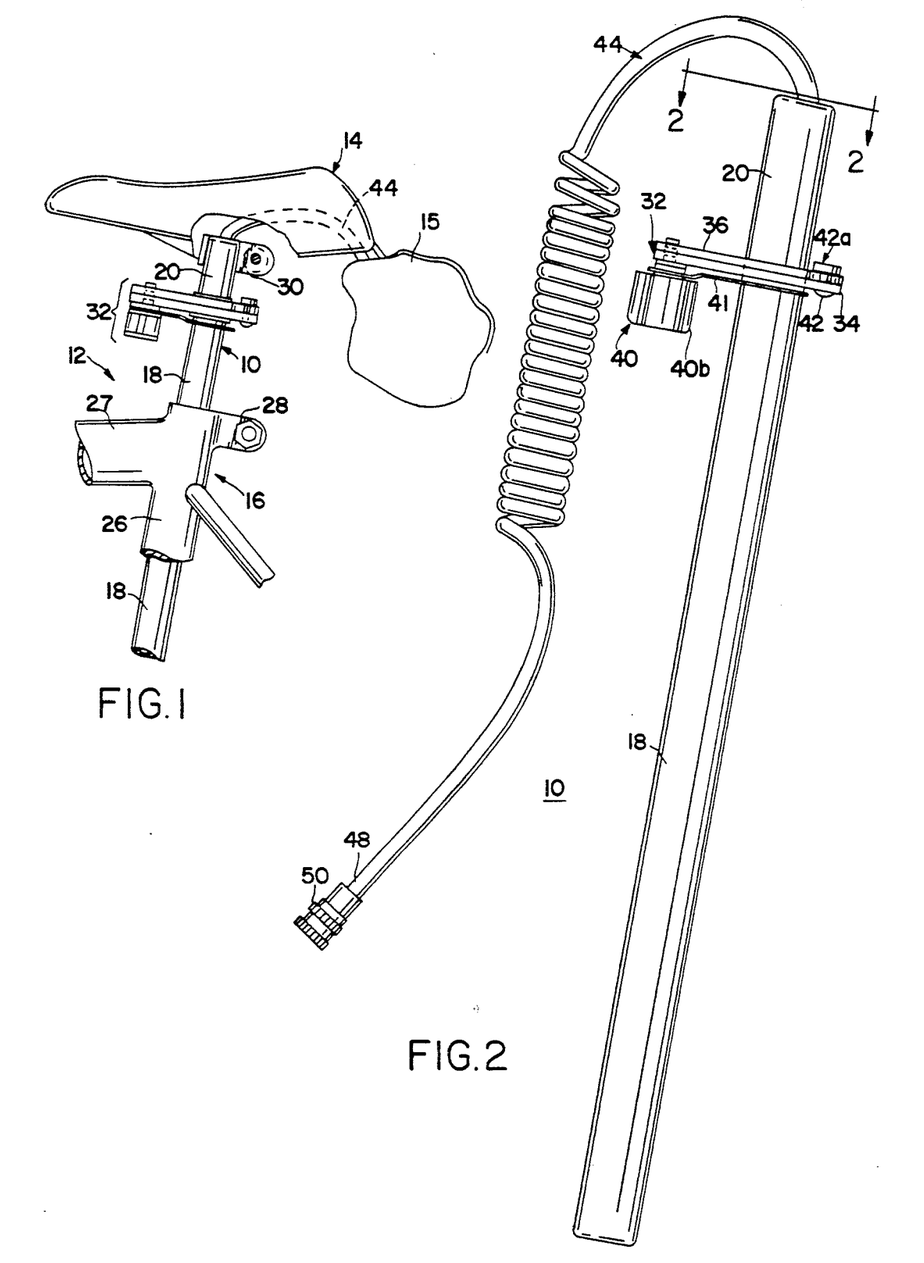
FIG. 1 is an isometric view of a preferred embodiment, high pressure, manually operable air pump of the present invention mounted on a bicycle.
FIG. 2 is a side elevation of the air pump of FIG. 1 removed from the bicycle.
Figure 2A:
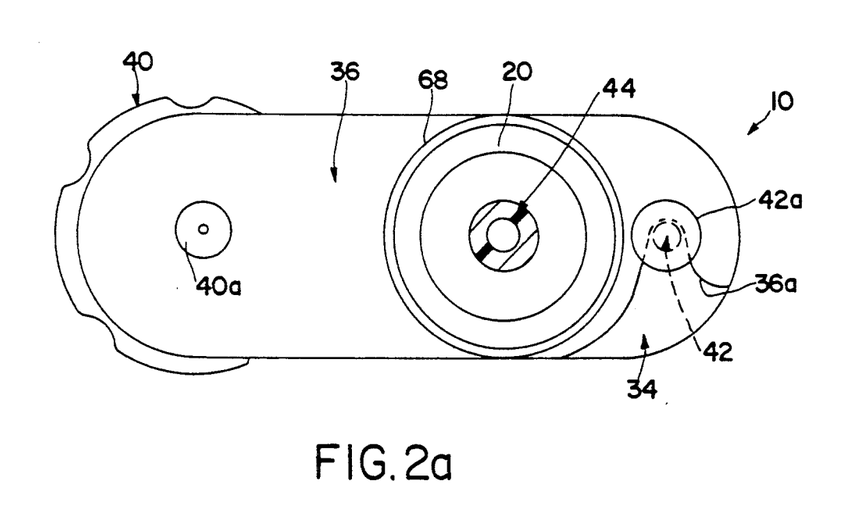
FIG. 2a is a cross-sectional elevation of the pump of FIGS. 1 and 2 taken along lines 2—2 of FIG. 2.

Referring to FIG. 2, where the air pump 10 is shown separated from the bicycle 12, the pump 10 includes a first elongated tube 18 and a second elongated tube 20, shorter than and coaxial with the first tube 18. The first tube 18 has an outer diameter sufficient to permit that tube to be removably received in the seat tube 26 of the frame 16 and clamped to the frame by a collar 28 (see FIG. 1) of the seat tube 26. Preferably, the outer diameter of the first tube is between about seven-eighths and one inch. The first tube 18 preferably also has a length sufficient to permit adequate height adjustment of the seat 14. Preferably, the first tube length is at least about twelve inches.

The second elongated tube 20 has an outer diameter preferably less than the outer diameter of the first tube 18 and sufficient to permit that tube to be removably received and clamped in the seat post collar 30 of seat 14 (also FIG. 1), preferably an outer diameter between about seven and eight-tenths of an inch. The second tube 20 need only be sufficiently long to permit it to be received in the seat post collar 30. The second tube 20 thus has a second length shorter than the first tube length desirably less than about three inches and preferably about two and one-half inches or less.

Means, indicated generally at 32, are provided for releasably fixedly securing together the first and second elongated tubes 18 and 20. This means securing so as to prevent relative translational or rotational movement of the elongated tube tubes 18 and 20 with respect to one another but in a releasable fashion. Preferably, means 32 comprises a first mating member, preferably in the form of a first elongated planar flange 34, which protrudes radially outwardly from an end (the upper end in the figures) of the first tube 18. Means 32 preferably further comprises a second mating member, preferably in the form of a second, identically elongated planar flange 36 protruding radially outwardly at an end (lower end in the figures) of the second tube 20 proximal the first tube 18. The planar flanges are parallel to one another to permit their joining together. Preferably, each of the first and second flanges 34 and 36 is fixedly secured to the first and second tubes 18 and 20, respectively, by suitable, conventional means such as brazing or, preferably, welding 68 (see FIG. 3). A first, removable fastener 40, a flexible support 41 (flexibly coupling the first fastener 40 with the first elongated tube 18), a second fixed fastener 42 and a flexible hose 44 having at its exposed end 48 an air valve coupling 50 are further depicted in FIG. 2. As is shown in FIG. 1, the pump 10 is preferably positioned with the first fastener 40 towards a front side of the seat 14 to fit into the space provided above the cross tube 27 of the frame 16 and the front side of the seat tube collar 28.

Figure 3:
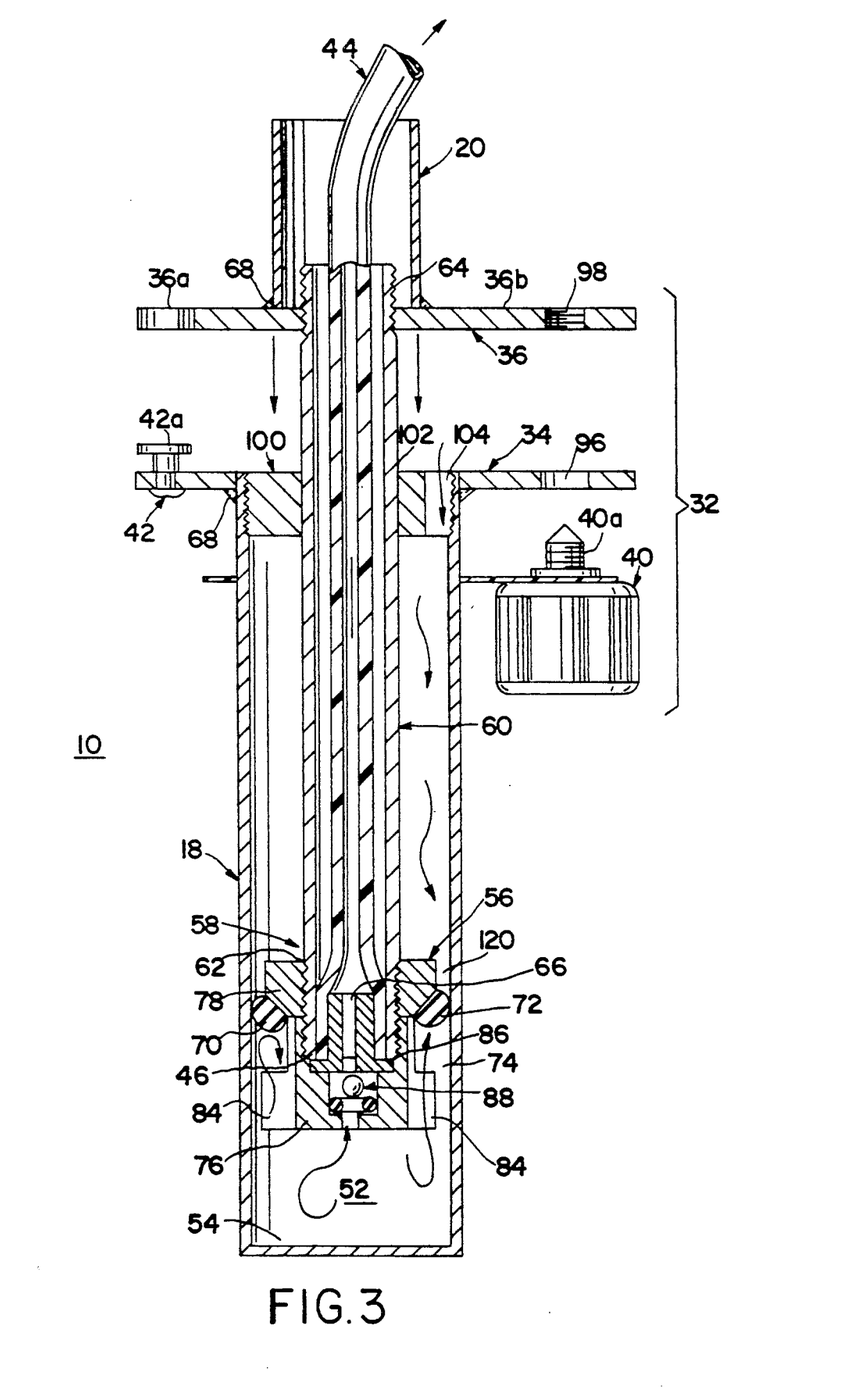
FIG. 3 is a cross-sectional elevation of the pump of FIGS. 1 and 2 during a compression stroke.
Figure 4:
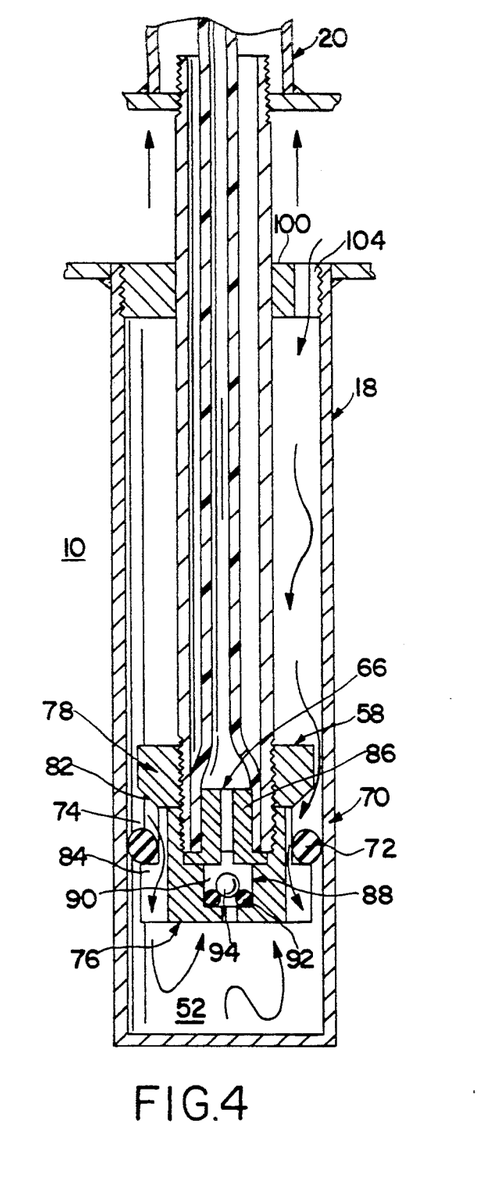
FIG. 4 is a cross-sectional elevation like FIG. 3 of the pump of FIGS. 1 and 2 during a refill stroke.

The internal construction of the pump 10 is revealed in FIGS. 3 and 4. The first elongated tube 18 constitutes a housing of the pump and defines a cylindrical pump chamber 52 therein having a closed end 54. A piston assembly, indicated generally at 56, is provided and includes a piston 58 within the chamber 52, a connecting arm 60 having a first end 62 coupled with the piston 58 and an opposing second end 64, and an air passage, indicated generally at 66, extending generally axially through the piston 58. The passage preferably continues through the connecting arm 60. The second end 64 of the connecting arm 60 is fixedly coupled with the second flange member 36 by suitable means such as mutually engaging threading. The second flange member 36 in turn fixedly supports the second elongated tube 20 which is secured to the second flange member 36 by suitable means such as the welds 68. Each of the second flange member 36 and the attached second elongated tube 20 provides a means for gripping the connecting arm 60 and manually reciprocating the piston 58 in the chamber 52. FIGS. 3 and 4 further depict a first, one-way valve means, indicated generally at 70, on the piston 58 and a second, one-way valve means, indicated generally at 88, along the air passage 66. The first valve means 70 opens to permit air to pass around the piston 58 into the closed end 54 of chamber 52 and closes for compressing air in the closed end of the chamber. The second valve means 88 opens to permit air being compressed in the closed end 34 of the chamber to pass into and along the air passage 66 when pressure of the air in the closed end exceeds that in the air passage and closes to prevent air from passing from the air passage 66 into the chamber 52 when pressure of the air passage air exceeds the pressure of the air in the closed end 54 of the chamber 52.

Referring to FIG. 3, the first valve means 70 preferably comprises an annular valve member 72, preferably an elastic O-ring, and groove means for receiving the annular valve member 72 on the piston 58. The groove means comprises a primary or first groove 74 and, preferably, a pair of secondary grooves 84. The first groove 74 extends circumferentially around an outer surface of the piston 58 and receives the annular valve member 72. Preferably, the first groove 74 is symmetric with respect to at least one radial and to all axial planes and has an axial dimension which is greater than the maximum axial dimension of the annular valve member 72, to permit axial movement of the valve member 72 along the first groove 74. As also can be seen in FIGS. 3 and 4, the piston 58 preferably is fabricated from first and second annular components 76 and 78, respectively, which are attached by suitable means, such as threading, to the first end 62 of the connecting arm 64. The first annular component 76 has one end of reduced diameter which forms the bottom of the first groove 74. The remainder of the component 76 is of a greater diameter and forms a land 83 defining one side or end of the groove means and, in particular, of the first groove 74. The second annular component 78 preferably includes a beveled circumferential surface 82 (best seen in FIG. 4) adjoining and facing the reduced diameter end of the first component 76. The beveled surface 82 forms a seat for the annular valve member 72 tapering outwardly, preferably beveled frustoconically, towards the adjoining outer circumferential surface of the piston proximal the inner circumferential surface of chamber 52. Surface 82 is located at an end of the groove means which is distal to the closed end 54 of the chamber 52. The seat 82 and land 83 retain the O-ring 72 in the first groove 74 and on the piston 58. Opposing secondary grooves 84 extend axially along the circumferential surface of the first annular component 76 beneath the first groove 74 and define passages extending through the land 83. These secondary grooves 84 define a portion of the groove means which are configured to permit air to pass through the first valve means 70, in particular, beneath the annular valve member 72 and through the piston 58, when the valve member 72 moves axially along the first groove 74 away from the valve seat surface 82 and is located as shown in FIG. 4 over that portion of the first groove 74 containing the axial extending secondary grooves 84. This will occur when the piston 58 is moved away from the closed end 54 of the chamber 52.

Preferably, a first end 46 of the flexible hose 44 is passed through the length of the connecting arm 60 and fixedly coupled to the first end 62 of the connecting arm 60 by means of an annular insert 86 which is received in the extreme end of the hose 44 clamping that end between the insert 86 and the inner circumferential surface of the connecting arm 60. Preferably, the outer cylindrical surface of the insert 86 which is received in the extreme end of the hose 44 is finished, for example by the provisions of threading or serrations, to better grip the first end 46 of the hose 44. In this way, the first end 46 of the hose 44 is fixedly coupled with the piston assembly 56 and the second tube 20 and pneumatically coupled with the air passage 66 in the piston 58.

Referring to FIG. 4, the insert 86 forms one end of the second, one-way valve means 88 located along the air passage 66. The remainder of the second valve means 88 is preferably provided by an interior chamber 90, which is formed in the first annular component 76, an elastic O-ring 92, which forms a seat of the valve means 88, and a movable valve member in the form of a sphere 94.

FIG. 3 further depicts details of the preferred means 32 for fixedly securing the first and second elongated tubes together. The preferred means 32 includes, in addition to the first and second flanges 34 and 36 and the first and second fasteners 40 and 42, an unthreaded bore 96 through the first flange member 34 and a threaded bore 98 through the second flange member 36. The threaded bore 98 is alignable with the unthreaded bore 96 for receiving a threaded portion 40a of the fastener 40 extending through the unthreaded bore 96, for fixedly securing together the mated first and second flange members 34 and 36 in a removable fashion. The second fastener 42 preferably is a rivet extending fixedly through the first flange 34 on a side of the tubes 18 and 20 diametrically opposed to the first fastener 40 and bores 96 and 98. A portion of the rivet 42, protruding axially from the first flange 34 towards the second flange 36, is received in a cut-out 36a, which is exposed on a side of the second flange 36, when the flanges 36 and 38 rotate to align the bores 96 and 98. Head portion 42a at the rivet 42 and the first flange 36 prevent relative axial movement of the second flange 38, thereby securing the tubes 18 and 20 together. The first and second fasteners 40 and 42 on opposing sides of the tubes 18 and 20 prevent bending of the pump at the flanges 36 and 38.

Lastly, an open end of the first elongated tube 18, opposite closed end 54, can be at least partially closed, for example by a third annular component 100, which includes a central bore 102 to permit extension of the second end 64 of the connecting arm 60 from the first elongated tube 18, and one or more additional bores, such as bore 104 which permits the free passage of air into and out of the first elongated tube 18. The component 100 prevents debris from entering the first tube 18. It may provide some support and guidance to the connecting arm 60 but the preferred construction of the piston assembly 56 is such that the assembly 56 maintains itself coaxial in the tube 18.

Figure 5:
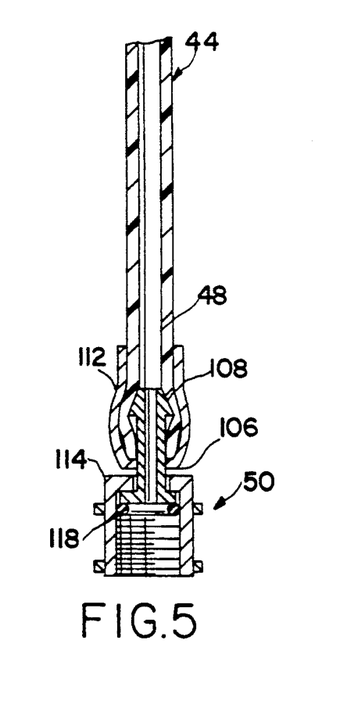
FIG. 5 is an expanded side section of a preferred air valve connector of the pump of FIGS. 1 through 4.

FIG. 5 depicts diagrammatically a preferred configuration for the air valve connector 50, also seen in FIG. 2. The connector 50 is mounted at a second end 48 of the flexible hose 44 and includes a central tubular member 106 one end of which has a conically tapered outer surface 108 which is inserted into the end 48 of hose 44. A fastening member 112 is clamped over the end 48 and one end of central member 106 fastening the connector 50 to the hose 44. A threaded collar 114 is rotatably supported at the remaining end of the central tubular member 106. The threaded collar 114 is sized to be received by a conventional air valve stem for coupling the flexible hose 44 to the stem. An annular sealing gasket 118, such as an O-ring, is preferably provided. It is specifically noted that unlike most conventional air valve connectors, the preferred connector 50 of the present invention lacks a central stalk or other solid structure for depressing the air valve in the valve stem (neither depicted). As will be subsequently explained in further detail, this is because the pump 10 of the present invention is capable of compressing air to a sufficiently high pressure to force depression of an air valve in a stem without physically contacting that valve.

As shown in FIG. 1, the pump 10 can be constructed of suitable material with suitable dimensions, for example, about 1018 to 1027 mild steel seamless tubing, preferably mandrel drawn, with about a 50 mil wall thickness, as the elongated tubes 18 and 20, so as to permit use of the pump 10 as the seat post for supporting a conventionally constructed bicycle seat 14 on a conventionally constructed bike frame 16. The pump 10 may be originally installed or subsequently installed as a replacement for a conventional seat post.

The pump 10 may be used by removing the flexible hose 44 from the storage bag 15 (FIG. 1), if provided, and the air valve connector 50 attached to a conventional threaded air valve stem like that which is provided with tires, tubes or the like. The fastener 40 is unscrewed from the second flange 36 and the tubes 18 and 20 rotated to free rivet 42 from flange 36 to separate first and second tubes 18 and 20. The second tube 20, still fixedly secured to the seat 14, may be raised and lowered by raising and lowering the seat 14 while the pump is still mounted on the bicycle 12 to reciprocate the piston 58 along the chamber 52. After use, rivet 42 and cutout 36a may be engaged and the threaded portion 40a of fastener 40 may again be passed through unthreaded opening 96 into the threaded bore 98 for securing the first and second tubes 18 and 20 together. The air valve connector 50 may be removed from the valve stem and the flexible hose 44 returned to the storage bag 15, if provided. Of course, the pump 10 may be used as a conventional hand-operated air pump when not mounted in a bicycle. It may be installed as a seat post in and subsequently removed from any number of conventional bicycles, without alterations to either the bicycles or their seats, making the pump 10 extremely versatile.

FIGS. 3 and 4 depict in detail the operation of the first and second valve means 70 and 88, which provide the pump 10 of the present invention with certain unique capabilities. FIG. 3 depicts the positions of the first and second valve means 70 and 88 during a compression stroke when the piston assembly 56 is being moved in a first axial direction (down in the figure) into the first tube 18 and towards the closed end 54 of the chamber 52. FIG. 4 depicts the configuration of the two valve means 70 and 88 during a reciprocal, refill stroke when the piston 58 is being moved in a second, opposing axial direction away from the closed end 54 of the chamber 52.

Referring first to FIG. 3, during the compression stroke, air is compressed by the piston 58 in the closed end 54 of the chamber 52 by the first valve means 70. In particular, the O-ring valve member 72 tends to drag slightly on the inner wall of chamber 52 during movement of the piston 58 towards the closed end 54, seating on the tapered valve seat (82 in FIG. 4) thereby sealing the closed end of the chamber and closing the first valve means. As the piston continues to move, the O-ring is dragged by friction with the chamber wall and forced by the air being compressed in the closed end 54 of the chamber farther out along the valve seat 52. The tapered surface of the seat 52 forces the O-ring 72, which is elastically deformable, to expand radially outwardly and further into contact with the inner circumferential surface of the chamber 52. In this regard, the tapered valve seat 82 used in connection with the elastic O-ring 72 is a very important feature of the invention. As the pressure of the air being compressed by the piston 58 builds up in the closed end 54, the O-ring 72 is pressed increasingly harder onto the valve seat 82 and farther into the narrowing gap 120 formed between the beveled surface of the seat 82 and the inner circumferential surface of the chamber 52. This increases O-ring contact with the seat and inner circumferential surface increasing the sealing effect. This particular configuration permits the preferred pump 10 to compress air to pressures of up to at least about two hundred psi. The major limitation to maximum air compression of the pump 10 is not the operation of the pump but rather the ability of the user to apply sufficient force to the piston assembly 56 to further compress the air.

Preferably, a single, first tube 18 defines both a housing and the cylindrical pump chamber contained therein. However, since the optimum outer diameter of the first tube 18 must be sufficiently large to permit that tube 18 to be clamped within a seat tube collar 28 of conventional construction, the diameter of the cylindrical chamber may be reduced, thereby reducing the cross-sectional area of the chamber 52 and total force which must be applied to the piston assembly 56 to achieve a given compression, for example by the use of the second elongated tube (not depicted) within the first elongated tube 18 to reduce the diameter of the cylindrical pump chamber 52.

During the compression stroke, the valve member sphere (94 in FIG. 4) of the second valve means 88 is eventually forced from the surface of the O-ring (92 in FIG. 4) when the pressure of the air being compressed at the closed end 54 of the chamber 52 exceeds the pressure of the air in the air passage 66, thereby permitting compressed air to pass from the chamber 52 into the air passage 66.

Referring to FIG. 4, during the reciprocal or refill stroke, the piston 58 is moved in a second, opposing axial direction (up in the figure) away from the closed end 54. Friction between the O-ring valve member 72 and the inner circumferential surface of the chamber 52 causes the member 72 to move away from the beveled seat 82 and over the axially extending grooves 84, thereby permitting air, which enters the first tube 18 through the additional bore 104 of the third annular component 100, to pass by the piston 58, in particular, through the secondary grooves 84 beneath the O-ring 72, and enter the closed end 54 of the chamber 52. At the same time, the compressed air in the air passage 66 and/or any partial vacuum created at the closed end 54 of the chamber 52 cause the sphere 94 of the second valve means 88 to be received in the seat provided by O-ring 92 thereby preventing air from passing through the air passage 66 into the chamber 52.

Although an elastic O-ring is preferred as the annular valve member 72 of the first valve means 70, it would be possible, though less desirable, to provide a substantially inelastic annular valve member, for example one of PTFE or nylon, and an at least resiliently and, preferably, elastically deformable, tapered valve seat 82 which is radially outwardly expanded into contact with the inner circumferential surface of the chamber 52 when the valve member 72 is seated against the valve seat 82 by compressed air in the chamber 52 for sealing the annular gap 120 seen in FIG. 3. Similarly, although a frustoconical surface is preferred for the valve seat 82, other tapered surface configurations may be employed.

Figure 6:
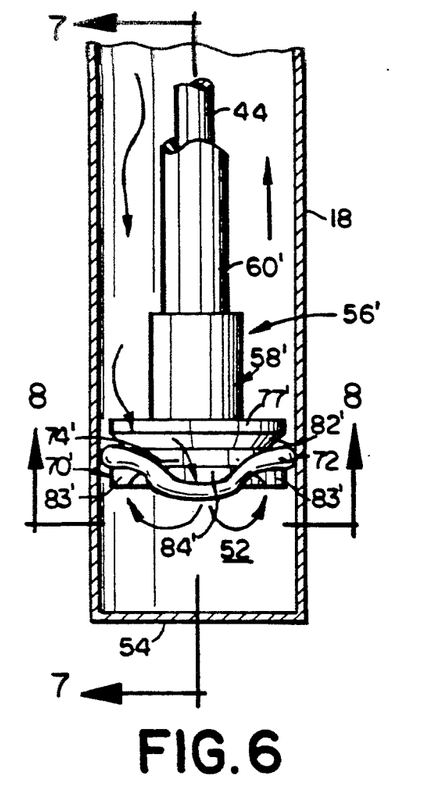
FIG. 6 is a cross-section elevation of a second embodiment of the air pump 10 of FIGS. 1 and 2 during a refill stroke.
Figure 7:
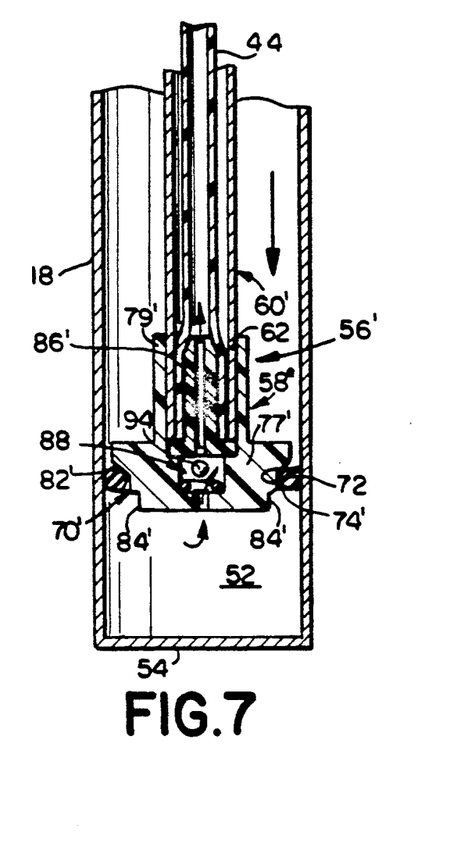
FIG. 7 is a cross-section elevation of the embodiment of FIG. 6, taken along the lines 7—7 of FIG. 6, during a compression stroke.
Figure 8:
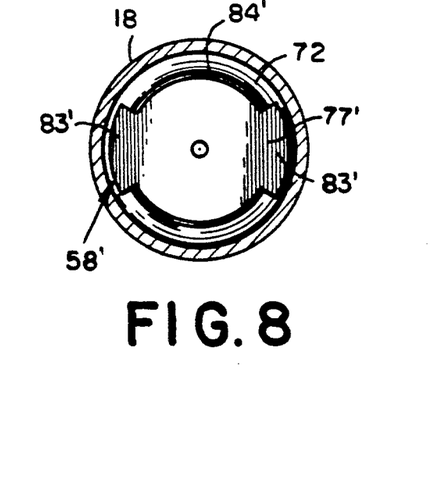
FIG. 8 is a transverse cross-section of the pump taken along the lines 8—8 of FIG. 7 during a compression stroke.

FIGS. 6 through 8 depict, in varying views, a second configuration of the piston assembly, indicated generally at 56' in those figures, of the manual air pump 10 previously discussed. The piston assembly 56' preferably includes a one-piece piston, indicated generally at 77', and a modified annular insert 86' (FIG. 7) for coupling a connecting arm 60' and first end of the flexible hose 44 to the piston 77'. The components 77', 60', 44 and 86' are all sized to form a compression friction fit securing the first end of the flexible hose 44 and one end of the connecting arm 60' between the annular plug member 86' and a concentric collar portion of the piston 77'.

The embodiment of FIGS. 6 through 8 differ from the embodiment of the previous figures in that a modified first air valve means is provided and indicated generally at 70'. Like the original first valve means 70, the modified valve means 70' includes groove means with a first groove 74' in an outer circumferential surface of the piston 77', a tapered, preferably frustoconical valve seat 82' formed in the piston 77' and defining an end of the first groove 74' distal to the closed end 54 of the chamber 52 and an annular valve member 72 again preferably provided by an elastic O-ring. Again, land means are provided preferably by a pair of diametrically opposed lands 83 at the end of the piston 77' proximal to the closed end 54 of the chamber 52. The axial length of the first groove 74' of the second embodiment, between the tapered valve seat 82 and the lands 83', is considerably less than the axial length of the first groove 74 of the first embodiment between tapered valve seat 82 and the land 83 of that embodiment and, preferably, no more than slightly more than the axial dimension of the O-ring 72. At at least one location along the outer surface of the piston 77' and, preferably, at two symmetrically located positions, the first groove 74' is extended axially along the piston between the lands 83' to an end of the piston 77' proximate the closed end 54 of the chamber 52 to form secondary grooves which are indicated at 84' in the figures. The secondary grooves 84' have an axial length greater than the maximum axial dimension of the adjoining O-ring valve member 72.

Operation of the second embodiment piston assembly 56' in a refill stroke is illustrated in FIG. 6. The secondary grooves 84' permit axial movement of the adjoining portions of the O-ring valve member 72 along those portions of the groove means when the piston assembly 56' is moved away from the closed end 54 of the chamber 52, as is indicated in FIG. 6. During such movement of the piston assembly 56', the portions of the O-ring 72 adjoining the secondary grooves 84' are retarded by frictional contact with the inner cylindrical surface of the chamber 52 defined by first elongated tube 18 and-/or a partial vacuum created at the closed end 54 of the chamber 52 through the operation of the second valve means 88, which causes those portions of the O-ring 72 to move away from the valve seat 82, breaking the air seal in those regions between the piston 77' and the inner circumferential surface of the chamber 52. The elastic O-ring 72 will continue to stretch towards the closed end 54 of the chamber 52 until sufficient clearance is provided between it, the piston 77' and inner circumferential wall of the chamber 52 to permit air to pass through the secondary grooves 84' into the closed end of the chamber 52. To minimize the flexure of the O-ring, it is preferred that the piston 77' be undercut in a radial direction more deeply in the secondary groove areas 84' than in the fully circumferential area of the first groove 74', so that a greater space is formed between the outer surface of the piston in the secondary groove areas 84' and the inner circumferential surface of the chamber 52. Operation of the second valve means 88 is identical to that previously described with respect to FIG. 4.

Operation of the second embodiment piston assembly 56' during a compression stroke is depicted in FIG. 7. In the ambient state, before pumping begins, the O-ring 72 will lie entirely in the first groove portion 74' of the groove means. Following a refill stroke like that illustrated in FIG. 6, elasticity of the stretched O-ring 72 and/or its contact with the inner circumferential wall of tube 18 will assist in moving the O-ring entirely into the first groove portion 74' to initially close the first valve means 70'. Air in the closed end 54 of the chamber 52 is trapped by the piston 77' and first valve means 70' and compressed. The compressed air bears against the O-ring 72 compressing it against the tapered valve seat 82 which expands the O-ring radially outwardly while directing the O-ring deeper and more completely into the annular gap provided between the piston 77' and the inner circumferential surface of the first elongated tube 18 thereby improving the seal.

The advantages of the second embodiment of FIGS. 6 through 8 over the first embodiment of FIGS. 1 through 5 is that the O-ring 72 seats more rapidly during the compression stroke in the second embodiment, thereby more efficiently using more of the length of the stroke. The one-piece piston construction of the second embodiment of FIGS. 6 through 8 is simpler and less expensive to manufacture and assemble than the multipiece piston construction of FIGS. 1 through 5.

Figure 9:
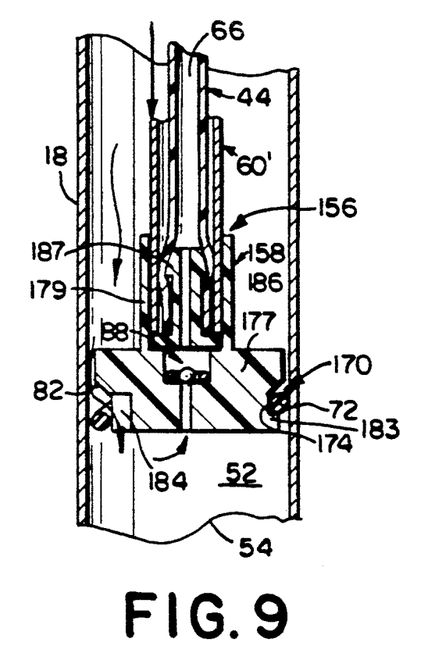
FIG. 9 is a cross-section elevation of a third embodiment of the air pump 10 of FIGS. 1 and 2 during a refill stroke.
Figure 10:
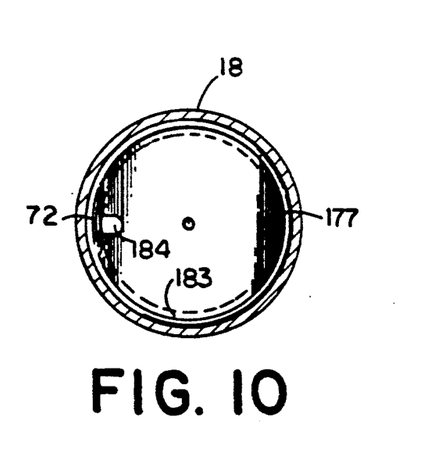
FIG. 10 is an end view of the air pump of FIG. 9 in a compression stroke.

FIG. 9 depicts a third embodiment piston assembly, indicated generally at 156. The assembly 156 again includes a piston 158 receiving on one side a smooth end of a connecting arm 60', preferably in the form of a hollow tube, and one end of flexible hose 44. The ends of the connecting arm 60' and flexible hose 44 are held within a cylindrical portion 179 of the piston 158 by means of an insert 186 which is provided with a flared head 187. Preferably, the piston head 177 is monolithic and formed from easily worked materials such as thermoplastic. First one-way valve means 170 is provided on the outer circumferential surface of the piston head 177 by means of a first, circumferential groove 174 which receives an annular valve member, again, preferably an elastic O-ring 72. The first, one-way valve means 170 compresses air in the closed end of the chamber 52 when the piston 158 is moved in a first axial direction (down in FIG. 9) towards the closed end of the chamber 52 and permits air to enter the closed end of the chamber 52 around and through the piston 158 when the piston 158 is moved in a second, opposing axial direction (up in FIG. 9) away from the closed end of the chamber 52 as is being depicted in FIG. 9. One side of the first groove 174 is formed by a circumferential surface 182, preferably at least somewhat tapered, forming a seat for O-ring 72. The opposing axial end of the first groove 174 is provided by a land 183 which extends entirely around the circumference of the piston head 177 except at and adjoining a point where a secondary groove 184 is provided underlying the first groove 174 and extending from beneath the first groove 174 to the axial end of the piston 158 facing the closed end of the chamber 52 (lower end in FIG. 9). This break in the land 183 is best seen in FIG. 10 and occurs where an exposed portion of the O-ring 72 can be seen on the left side of the figure. The same second, one-way valve means 88 and air passage 66 are again provided.

The third embodiment of FIGS. 9–10 is perceived to be superior to the second embodiment of FIGS. 6–8 in that the extension of the land 183 almost completely around the circumference of the piston 158 and the relatively small portion of the land 183 which is eliminated about the secondary groove 184 minimizes the portion of the O-ring 72 which is permitted to move axially past the land 183 and therefore which is subject to fatigue in use. The axial extent of the secondary groove 184 is relatively greater than the secondary grooves 84' of the second embodiment or even the original grooves 84 of the first embodiment and lies virtually beneath the O-ring 72 even when the ring 72 is seated against the valve seat surface 182 so that the slightest movement of the O-ring 72 from the valve seat 182 provides an immediate opening around the O-ring 72 and into the closed end of the chamber 52.

Figure 11:
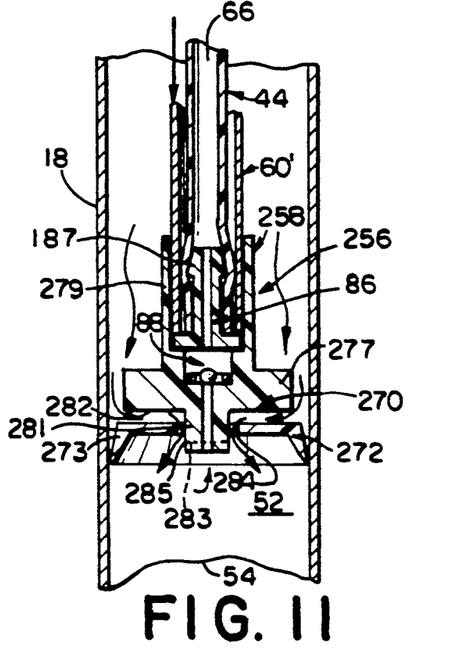
FIG. 11 is a cross-sectional elevation of a fourth embodiment of the air pump 10 of FIGS. 1 and 2 during a refill stroke.
Figure 12:
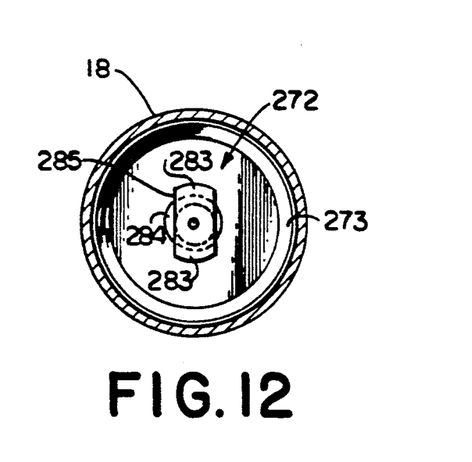
FIG. 12 is an end view of the air pump embodiment shown in FIG. 11 in a compression stroke.

FIGS. 11-12 depict a fourth embodiment in the invention which differs from the first three embodiments in the detail of the piston 258 of the piston assembly 256 and, in particular, the configuration of the head 277 of the piston 256 and the first valve means, indicated generally at 270, which is again provided on the piston 256 for compressing air in the closed end (lower end in FIG. 11) of the chamber 52 when the piston is moved in a first axial direction (down in FIG. 11) towards the closed (lower) end of the chamber 52 and for permitting air to enter that closed end of the chamber 52 when the piston 258 is moved in a second, opposing axial direction (up in FIG. 11) away from that closed end of the chamber 52. The piston 258 again includes a cylindrical portion 279 receiving ends of the connecting arms 60' and the flexible tube 44 and further receiving the insert 186 with flared head 187. The piston 258 further includes an annular head portion 277 having an outer circumference slightly less than the inner circumference of the tube 18 forming the chamber 52 to permit air to pass therearound. Supported coaxially from the head 277, facing towards the closed end of the chamber 52, is an annular stalk 281 having at its extreme axial end proximal the closed end of the chamber 52 a pair of radially outwardly extending lands 283 (see FIG. 12). The lands 283 retain an annular valve member 272 on the annular stalk 281 permitting movement of that valve member towards and away from a planar surface 282 on a facing side of the piston head 277. When the valve member 272 is pressed against the planar surface 282, as occurs during a compression stoke of the device, a large sealing surface area is provided between the valve member 272 on the surface 282, preventing air from passing through an opening 284, provided at the center of the valve member 272, and the outer circumferential surface of the stalk 281. The opening 284 is larger than the cross-section of the stalk 281, permitting air to pass therebetween when the valve member 272 moves away from the planar surface 282. The portion of the stalk 281 between the planar surface 282 and the lands 283 constitute the first groove of the groove means while the flats 285 at the ends of the stalk 281, which form the sides of the lands 283 constitute the second groove means. While this embodiment lacks a beveled valve seat, the relatively large seat formed by the planar surface 282 acts in a similar fashion. The greater the air pressure in the closed end of the pump chamber 52, the greater the force on the valve member 272 and the more effective the seal between it and the planar surface 282. There is no likelihood of the valve member 272 rolling over the outer circumferential edge of the planar surface 282, even at very high pressures within the closed end of the chamber 52. The valve member 272 further includes a skirt 273 extending towards the closed end of the chamber 5 and flaring radially outwardly as it tapers in thickness. Skirt 273 completes the sealing between member 272 and the inner wall of the tube 18. The skirt 273 provides a concavity to the valve member 272 facing the closed end of chamber 52. Again, second, one-way valve means 88 are provided axially within the piston assembly 156 along air passage 66.

The fourth embodiment of FIGS. 11-12 provides a beneficial result similar to that provided by the construction of the first three embodiments in that the first one-way valve 270 on piston 258 is provided by an annular member 272 which is permitted axial movement along the piston 258 and is constructed in a way in which pressure of the air being compressed in the closed end of the chamber 52 by that valve means only forces the annular member 272 of the first valve means more securely against the piston 258, thereby improving the seal. Because air passes through the center of the valve member 272 rather than along its edges as is the case in conventional air pumps, the valve member 272 can be made much more rigid than the flexible rubber or leather diaphragms typically found in conventional air pumps. Indeed, the annular valve member 272 need not be elastic, but merely resilient and long wearing. The axial length of the skirt 273 and the generally concave shape of the valve member 272 facing the closed end of the chamber 52 further contribute to the sealing effect between the skirt 273 and the side wall of the tube 18 when air is being compressed in the closed end of the chamber 52.

Figure 13:
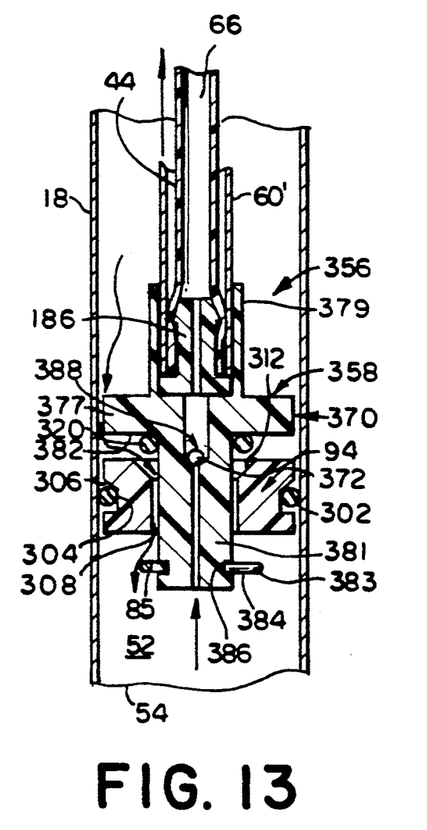
FIG. 13 is a cross-sectional elevation of a fifth embodiment of the air pump 10 of FIGS. 1 and 2 during a refill stroke.
Figure 14:
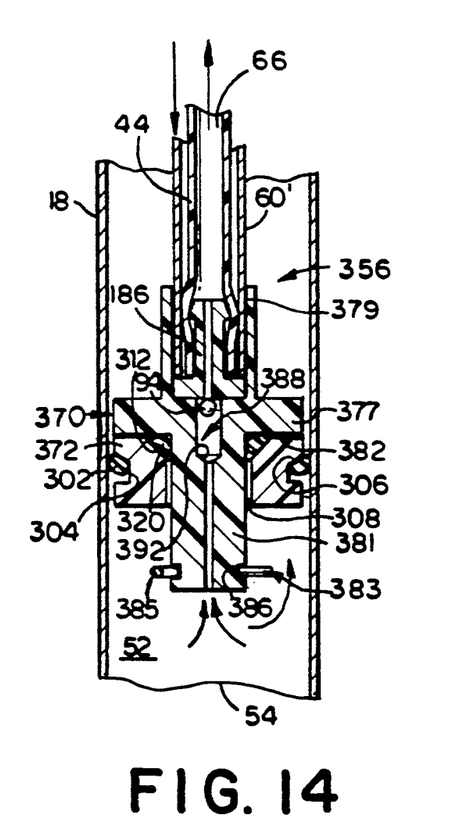
FIG. 14 is a cross-sectional elevation of a fifth embodiment of the air pump 10 of FIGS. 1 and 2 during a compression stroke.

FIGS. 13 and 14 depict refill and compression strokes, respectively, in a presently preferred, fifth embodiment piston assembly, indicated generally at 356, of the pump 10 of FIGS. 1 and 2. The refill stroke is just beginning in FIG. 13. The piston assembly 356 includes piston 358 and connecting arm 60'. Again, a cylindrical end 379 receives one end of the connecting arm 60, and an end of the flexible air hose 44, which are again compressively and frictionally held within the cylindrical end 279 by the annular member 186. The piston 358 further includes an annular head portion 377 having an outer circumference slightly less than the inner circumference of the tube 18 forming the chamber 52. Supported coaxially from the head 377, facing the closed end 54 of the chamber 52, is an annular stalk 381 having at its extreme axial end proximal the closed end 54 of the chamber 52, land means in the form of a removable spring clip 383. The clip 383 is received in a circumferential groove 386 on stalk 381 and retains an annular member 372 on piston 258. An elastomeric O-ring 302 is received in a groove 304 extending circumferentially around the member 372. The axial end of the groove 304, distal to the closed end 54 of the chamber 52, preferably includes a tapered annular surface 306 which functions identically to the tapered annular surface 82 of the first, second and third embodiments. The annular member 372 further includes a central opening 308, slightly larger than the radial dimensions of the stalk 381 to permit air to pass between the stalk 381 and the annular member 372. The annular member 372 includes another tapered annular surface 312 extending about the central bore 308, facing the head 377 and planar surface 382 of the piston head 377. An O-ring 320 is carried around the base of the stalk 381 where the stalk 381 intersects the planar surface 382. Thus positioned, the O-ring 320 does not move and effectively constitutes part of piston 358. The O-ring 320 contacts the annular tapered surface 312 when the piston head 377 is pressed against the annular member 372. A first valve means, indicated generally at 370, is thus formed by the head 377 and O-ring 320 of piston 358 and the annular member 372 and O-ring 302 for compressing air in the closed end 54 of the chamber 52 when the piston 358 is moved in a first axial direction (down in the figures) towards the closed end 54 of the chamber 52, as shown in FIG. 14, and for permitting air to enter the closed end 54 of the chamber 52 when the piston 358 is moved in a second, opposing axial direction (up in the figures) away from the closed end 54 of the chamber 52, as shown in FIG. 13. The annular member 372 is thus captured on the stalk 381 between the clip 383 and the head 377 of the piston 358 and functions as a floating valve seat while the piston head 377 and its carried O-ring 320 operate as a valve. First groove means is provided by stalk 381 between surface 382 and clip 383.

Openings between leg 384 and a symmetric leg (not seen) of the clip pin 383 and opening 385 at the bight end of clip 383 permit air to pass through the pin 383 even when the annular member 372 is pressed firmly against the pin 383 during the refill or upstroke of the piston 358 and constitute second groove means on the first valve means 370.

Again, second, one-way valve means 388 is provided axially through the piston 358 for permitting air to pass from the closed end 54 of the chamber 52 into the air passage 66 when the piston 358 is being moved in the first axial direction (down in the figures) towards the closed end 54 of the chamber 52 and for preventing air from passing through the air passage 66 into the closed end 54 of the chamber 52 when the piston 358 is being moved in the second axial direction (up in the figures). In this embodiment, preferably a beveled annular valve seat 392 is substituted for O-ring 92 of valve means 88.

During an upstroke, member 372 initially remains stationary on the inner circumferential surface of the first tube 18 forming the pump chamber 52, until it is contacted by clip 383. O-ring 302 causes that member 372 to continue to lag on clip 383 while the piston 358 is raised. Air then is free to pass between the outer circumferential surface of the head 377 and the inner circumferential surface of the tube 18, between the planar surface 382 and the facing surface of the annular member 372 and along the bore 308 between the inner circumferential surface of that bore and the outer surface of the piston stalk 381. At the same time, compressed air in passage 66 and/or the partial vacuum formed in the closed end 54 of the chamber 52 when the piston 358 is raised causes the second, one-way valve means 388 to close, preventing air from passing between the air passage 66 and the closed end 54 to the chamber 52.

During a compression stoke, illustrated in FIG. 14, the piston head 377 is moved towards the closed end 54 of the chamber (down in the figures) until the O-ring 320 on the stalk 381 contacts the opposing beveled surface 312 of the annular member 372 whereupon a seal is formed closing the first, one-way valve means 370. Further movement of the piston 358 toward the closed end 54 in chamber 52 compresses the air trapped in the closed end 54 of the chamber. This air bears against the O-ring 302 on the outer circumferential surface of the annular member 372 forcing that O-ring against the beveled surface 306 thereby increasing the sealing effect. The buildup in air pressure further forces the O-ring 320 into the narrowing gap formed by the tapered annular surface 312 and the opposing planar surface 382 of the piston head 377, thereby increasing the sealing effect of that member. Spherical valve member 94 is eventually forced from tapered seat 392 opening the second valve means 388 permitting the compressed air to pass into the air passage means 66. This embodiment has been found to develop air pressures of about 150 psi or more. The advantages provided by this construction include simple molding, easy assembly and long wear by elimination of the elongated stretching of the O-rings as occurs in the first three embodiments.

While the disclosed pumps are eminently suitable for manual operation and for use as the seat post of a bicycle, the pump 10 may be modified for automatic, mechanical reciprocation and may be modified to pump other fluids, namely liquids.

From the foregoing description, it can be seen that the present invention provides a unique, versatile, and manually operable pump, which can be configured as a bicycle air pump possessing significant advantages over conventional bicycle air pumps.

While various modifications have been described and/or suggested, one of ordinary skill in the art will recognize that changes could be made to the above-described embodiment of the invention without departing from the broad inventive concepts thereof. It is understood, therefore, that this invention is not limited to the particular embodiment(s) disclosed, but is intended to cover any modifications which are within the scope and spirit of the invention, as defined by the appended claims.

I claim:

1. A manually operable air pump for mounting a seat on a bicycle frame, comprising:
   a housing containing a pump chamber having a closed end;
   a piston assembly including a piston within the chamber, a connecting arm having a first end coupled with the piston and an opposing second end, and an air passage extending generally axially through the piston;
   means coupled with the connecting arm for manually reciprocating the piston in the chamber;
   first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber, the first one-way valve means comprising an annular member, and groove means extending circumferentially entirely around the piston and into an outer circumferential side of the piston and receiving the annular member, at least part of the groove means having an axial dimension with respect to the piston greater than a maximum axial dimension of at least an adjoining portion of the annular member to permit at least the adjoining portion of the annular member to move axially on the piston along the portion of the groove means sufficiently to permit air to pass through the first valve means along the groove means, the first valve means further comprising a tapered annular seat on one of the piston and the annular member for contacting the outer one of the piston and the annular member and closing the first valve means;

second, one-way valve means for permitting air to pass from the chamber into the air passage when the piston is being moved in the first axial direction and for preventing air from passing through the air passage into the chamber when the piston is being moved in the second axial direction;

the housing comprising a first elongated tube having an outer diameter sufficient to permit the first elongated tube to be removably received in a seat tube of a frame of a bicycle and clamped by a collar of the seat tube;

the means for manually reciprocating comprising a second elongated tube having an outer diameter sufficient to permit the second elongated tube to be removably received and clamped in a seat post collar of a bicycle seat;

the pump further comprising means for releasably immovably securing together the first and second elongated tubes.

2. The pump of claim 1, wherein the remaining one of the piston and the annular member comprises an elastically deformable O-ring positioned to contact the tapered annular seat and close the first valve means.

3. The pump of claim 1, wherein the tapered seat is a generally frustoconical surface.

4. The pump of claim 1, wherein the groove means comprises a first groove and at least one secondary groove, the first groove extending circumferentially around the piston and having said axial dimension greater than the maximum axial dimension of the annular member, the at least one secondary groove extending axially in the piston from beneath the first groove.

5. The pump of claim 1, wherein the annular member includes the tapered annular surface and wherein the piston includes an annular elastomeric portion adjacent the tapered annular surface for contacting the surface and closing the one-way valve means.

6. A manually operable air pump for mounting a seat on a bicycle frame, comprising:

a housing containing a pump chamber having a closed end;

a piston assembly including a piston within the chamber, a connecting arm having a first end coupled with the piston and an opposing second end, and an air passage extending generally axially through the piston;

means coupled with the connecting arm for manually reciprocating the piston in the chamber;

first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber, the first one-way valve means comprising an annular member, and groove means extending circumferentially entirely around the piston and into an outer circumferential side of the piston and receiving the annular member, at least part of the groove means having an axial dimension with respect to the piston greater than a maximum axial dimension of at least an adjoining portion of the annular member to permit at least the adjoining portion of the annular member to move axially on the piston along the portion of the groove means sufficiently to permit air to pass through the first valve means along the groove means, the annular member comprising an elastomeric O-ring and wherein part of the groove means has an axial dimension in an axial direction of the piston only slightly greater than an axial dimension of the O-ring so as to substantially prevent axial movement of part of the O-ring with respect to the piston;

second, one-way valve means for permitting air to pass from the chamber into the air passage when the piston is being moved in the first axial direction and for preventing air from passing through the air passage into the chamber when the piston is being moved in the second axial direction;

the housing comprising a first elongated tube having an outer diameter sufficient to permit the first elongated tube to be removably received in a seat tube of a frame of a bicycle and clamped by a collar of the seat tube;

the means for manually reciprocating comprising a second elongated tube having an outer diameter sufficient to permit the second elongated tube to be removably received and clamped in the seat post collar of a bicycle seat;

the pump further comprising means for releasably immovably securing together the first and second elongated tubes.

7. A manually operable air pump for mounting a seat on a bicycle frame, comprising:

a housing containing a pump chamber having a closed end;

a piston assembly including a piston within the chamber, a connecting arm having a first end coupled with the piston and an opposing second end, and an air passage extending generally axially through the piston;

means coupled with the connecting arm for manually reciprocating the piston in the chamber;

first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber, the first one-way valve means comprising an annular member, and groove means extending circumferentially entirely around the piston and into an outer circumferential side of the piston and receiving the annular member, at least part of the groove means having an axial dimension with respect to the piston greater than a maximum axial dimension of at least an adjoining portion of the annular member to permit at least the adjoining portion of the annular member to move axially on the piston along the portion of the groove means sufficiently to permit air to pass through the first valve means along the groove means, the annular member comprising a central portion at least partially received in the groove means and a skirt portion extending circumferentially about the central portion and axially away from the central portion towards the closed end of the chamber;

second, one-way valve means for permitting air to pass from the chamber into the air passage when the piston is being moved in the first axial direction and for preventing air from passing through the air passage into the chamber when the piston is being moved in the second axial direction;

the housing comprising a first elongated tube having an outer diameter sufficient to permit the first elongated tube to be removably received in a seat tube of a frame of a bicycle and clamped by a collar of the seat tube;

the means for manually reciprocating comprising a second elongated tube having an outer diameter sufficient to permit the second elongated tube to be removably received and clamped in the seat post collar of a bicycle seat;

the pump further comprising means for releasably immovably securing together the first and second elongated tubes.

* * * * *